(12) United States Patent
Kita

(10) Patent No.: US 6,685,179 B2
(45) Date of Patent: Feb. 3, 2004

(54) POSITIONING DEVICE AND POSITIONING METHOD

(75) Inventor: Toshiki Kita, Kobe (JP)

(73) Assignee: Agilent Technologies, Inc., Palo Alto, CA (US)

(*) Notice: Subject to any disclaimer, the term of this patent is extended or adjusted under 35 U.S.C. 154(b) by 218 days.

(21) Appl. No.: 09/997,806

(22) Filed: Nov. 30, 2001

(65) Prior Publication Data

US 2002/0130457 A1 Sep. 19, 2002

(30) Foreign Application Priority Data

Jan. 15, 2001 (JP) ........................................ 2001-006455

(51) Int. Cl.⁷ ............................................... B25B 1/10
(52) U.S. Cl. ........................... 269/244; 269/73; 269/21; 324/262
(58) Field of Search ............................ 269/244, 73, 21, 269/285, 286; 324/262; 308/31, DIG. 1, 9, 5 R, 160; 108/137, 143; 248/424, 429; 33/1 M, 174 L; 250/442, 311; 254/894

(56) References Cited

U.S. PATENT DOCUMENTS

| | | | | |
|---|---|---|---|---|
| 4,234,175 A | * | 11/1980 | Sato et al. | ............ 269/73 |
| 4,392,642 A | * | 7/1983 | Chitayat | ............ 269/73 |
| 4,667,139 A | * | 5/1987 | Hirai et al. | ............ 318/687 |
| 4,778,143 A | | 10/1988 | Koshiba | |
| 4,834,353 A | * | 5/1989 | Chitayat | ............ 269/73 |
| 5,114,302 A | | 5/1992 | Meisser et al. | |
| 6,531,867 B1 | * | 3/2003 | Greene et al. | ............ 324/262 |

FOREIGN PATENT DOCUMENTS

WO    WO 99/66498    12/1999

* cited by examiner

*Primary Examiner*—Joseph J. Hail, III
*Assistant Examiner*—Daniel Shanley

(57) ABSTRACT

A positioning device for determining the position of an object includes an anchoring surface, a first movable carriage on which the object is loaded and which has a means for suctioning onto the anchoring surface, a second movable carriage which has a drive assembly and which is connected with the first movable carriage as needed, and a connecting means which controls the connection of the first and second movable carriages. The first and second movable carriages are connected by the drive assembly and the first movable carriage is conveyed to a predetermined position on the anchoring surface and is suctioned and anchored on the anchoring surface at this position by a means for breaking the connection between the first and second movable carriages and for performing the suctioning to position the object.

17 Claims, 11 Drawing Sheets

POSITIONING DEVICE AND POSITIONING METHOD

BACKGROUND OF THE INVENTION

1. Field of the Invention

The present invention pertains to an object positioning device, and in particular, to a three-dimensional positioning device and a positioning method that are used for measuring instruments and are of high accuracy in terms of ideal positioning and low cost.

2. Discussion of the Background Art

There are many opportunities for positioning probes for transmitting and receiving electric signals in cases of circuits to be tested and for heads for recording data or reading data from recording media, etc., with measuring instruments. Furthermore, in recent years there has been a demand for miniature, high-density circuits and recording media, and as a result, higher positioning accuracy. In order to facilitate understanding of the present invention, the latter will be described below in the present Specification using as an example magnetic recording media, particularly, the testing device for magnetic heads that read-write data onto a hard disk. The device and method that will be explained belong to the ideal field of use of the present invention, but the field of use of the present invention is not restricted to that described herein.

The magnetic head positioning device simulates the actual read-write operation of a magnetic head and therefore, has movable carriages with which approximate positioning is performed and a precision positioning stage with which precision positioning is performed. The stage for precision positioning, onto which a magnetic head is loaded and this magnetic head is driven and positioned by a piezo element, is anchored on a movable carriages and operates as one unit with the movable carriage. Although the accuracy of the approximate positioning is inferior to the accuracy of the precision positioning, its stability must be high enough to guarantee the accuracy that is realized with the precision positioning. The positioning range of the stage for precision positioning is 10 μm and resolution is from several nm to several ten nm, and the movable carriage has a range of movement from 100 mm to 150 mm, in typical positioning devices. Unless otherwise described in the Specification of the present invention, the magnetic head and precision positioning stage and related circuits, etc., are referred to simply as "head".

It is necessary, for instance, to perform positioning in a horizontal direction and positioning in a vertical direction in order to produce a more exact approximate positioning of the head. Therefore, a stationary plate that provides a reference horizontal surface or a mechanism equivalent to this stationary plate, etc., is set up and the head is positioned at a predetermined position on this reference horizontal surface and at a predetermined height from this reference horizontal surface.

Positioning device 10 of a first prior art design is shown in FIG. 1. By means of positioning device 10, a pair of linear guides 12A and B, which are set up parallel to one another on stationary plate 11, guide movable carriage 13 traveling along these linear guides 12A and B. Head 16 is anchored to movable carriage 13. Servo motor 15 is anchored to one end of linear guides 12A and B and the axis of this servo motor 15 engages and drives nut 17, which is attached to movable carriage 13 via ball screw 14, to drive movable carriage 13. Ball screw 14 is turned when the axis of servo motor 15 rotates and movable carriage 13 moves forward or backward along linear guides 12A and B. Movable carriage 13 moves back to the side of servo motor 15 and head 16 is replaced, adjusted, etc. Then movable carriage 13 is moved forward away from the side of servo motor 15 and is stopped at a predetermined position, where the head is tested, etc. The height of linear guides 12A and B and movable carriage 13 is selected so that the height of head 16 from the surface of the stationary plate is a predetermined height.

Positioning device 20 of a second prior art design is shown in FIG. 2. By means of positioning device 20, tilt base 24 is attached so that it can turn as needed to tilt axis of rotation 23 anchored to a pair of bearings 22A and B set up parallel to one another on stationary plate 21. Tilt base 24 holds pedestal 25, to which head 26 is anchored at the end opposite tilt axis of rotation 23, and performs a tilt operation (inclination operation) in the direction of arrow T in the figure in order to position head 26 using an actuator, such as an air cylinder, etc., that is not shown. Head 26 is positioned away from stationary plate 21 by the actuator and the head is replaced, adjusted, etc., then tilt base 24 is lowered toward stationary plate 21 and re-positioned by the actuator, and tests, etc., are performed on head 26 and the media.

In the above-mentioned example, tilt axis of rotation 23 was parallel to the top surface of stationary plate 21, but a structure wherein it is perpendicular is also possible. In this case, tilt base 24 engages with and is driven by tilt axis of rotation 23 and the head is moved up and down parallel with the top surface of stationary plate 21.

Positioning device 30 of a third prior art design is shown in FIG. 3. By means of positioning device 30, movable carriage 34 moves along a pair of guides 32A and B set up parallel to one another on stationary plate 31. The stators of linear motor 36 are attached to guide 32B and movable carriage 34 functions as a runner of linear motor 36. Moreover, linear scale 37 is attached to guide 32A along the direction in which the movable carriage moves and gives the position of movable carriage 34.

In addition, by means of the technology disclosed in International Patent Application WO 99/66498 (Dec. 23, 1999) in which the above-mentioned design was modified, movable carriage 34 in FIG. 3 is moved by being floated up from around the outside by air bearings. On the other hand, movable carriage 34 is firmly vacuum suctioned onto stationary plate 31 when it stops so that it is positioned with stability. Movable carriage 34 is pre-vacuum suctioned at the vacuum suction opening and when running, is floated up by the compressed air that is introduced from the air release hole. This technological solution is very stable with high-speed designs, reaching a stability of ±10 nm within 50 ms after the carriage moves.

The positioning devices of the above-mentioned first and second designs of the prior art are relatively inexpensive. However, the accuracy and stability of the resting position of moving tubes and the accuracy and stability of the posture of the movable carriages are insufficient. The movable carriages are held by ball screws and axes of rotation, both when driven and when resting, and therefore, the accuracy and stability of the base position are poor because of restrictions in terms of backlash and rigidity of the ball screws, the rigidity of the axis of rotation, and the holding power of the servo motor and actuator. When viewed in terms of resting convergence speed, the vibration amplitude increases as rigidity decreases and speed is relatively slow. Moreover, it is difficult to always keep the suctioning surface and anchoring surface (top surface of the stationary plate)

for the movable carriages parallel to one another and therefore, efficient vacuum suctioning for stable anchoring of the resting carriage position is not possible.

By means of the positioning device of the above-mentioned third design of the prior art, the connection with the drive mechanism is cut when the moving carriage is resting and the position is maintained with stability by vacuum suctioning. However, there is a demand for a very high finishing accuracy of the compressed-air release opening and flotation surface in order to produce stable flotation in particular. Therefore, the finishing cost of the movable carriage increases. Moreover, because the amount by which the movable carriage floats has a strong effect on positioning accuracy, it is necessary to accurately adjust the amount of flotation. Consequently, device cost increases.

Therefore, there is a strong need for the presentation of a very stable, inexpensive positioning device that has both the low cost of the positioning devices of the above-mentioned first and second designs of the prior art, etc., and the high stability of the positioning device of the above-mentioned third design of the prior art, etc.

SUMMARY OF THE INVENTION

By means of the positioning device of the present invention, the connection between first and second movable carriages is broken and they are moved away from one another to eliminate the mechanical vibrations and force originating from the second movable carriage so that when the first movable carriage is positioned and comes to a rest, position stability is improved, using inexpensive structural elements and structural method.

The positioning device for determining the position of an object that is the first subject of the present invention comprises an anchoring surface, a first movable carriage on which this object is loaded and which has a means for suctioning onto this anchoring surface, a second movable carriage which has a drive assembly and which is connected with the first movable carriage as needed, and a connecting means which controls said connection of said first and second movable carriages. Moreover, said first and second movable carriages are connected by the above-mentioned drive assembly and said first movable carriage is conveyed to a predetermined position on the above-mentioned anchoring surface and said first movable carriage is suctioned and anchored onto said anchoring surface at this predetermined position by a means for breaking the connection between said first and second movable carriages and performing the above-mentioned suctioning so that the above-mentioned object is positioned.

By means of a positioning device with this type of structure, an inexpensive drive assembly and the second movable carriage can be connected to or disconnected from the first movable carriage with an inexpensive connecting means. Consequently, an inexpensive drive assembly and inexpensive second movable carriage can be used with which propagation of mechanical noise to the object is minimized and high positioning stability is maintained. Therefore, the cost of the positioning device is reduced.

Moreover, the connecting means is anchored to said first movable carriage and the connecting means can therefore also use the power that is employed for suctioning by the suctioning device. That is, the device can be simplified by common use of object control and consumed power. Moreover, it is also possible to select the method of controlling the connecting means as needed so that the connecting means is anchored to the above-mentioned second movable carriage and the connecting means is unaffected by the first movable carriage once the first movable carriage has been suctioned and anchored.

Furthermore, by using a vacuum suction plate with a gas feed and evacuation opening that communicates with a gas feed and evaluation device as the means for performing suctioning, the device, which uses inexpensive, ordinary air, is inexpensive and easy to maintain, and operating cost is also low.

Selecting a structure with a ball screw which engages with this first movable carriage and which is used for moving the above-mentioned first movable carriage forward and a motor which is used for turning this ball screw as the above-mentioned drive assembly is ideal for linearly moving an object back and forth between the test position and the holding position with an ordinary, inexpensive device.

At the same time, it is also possible to use a structure that has an axis of rotation which keeps the above-mentioned first movable carriage inclined as needed with respect to the above-mentioned anchoring surface and which is used for inclining the above-mentioned first movable carriage with respect to the above-mentioned stationary surface, and an actuator which controls the inclination of the first movable carriage by rotating this axis of rotation as the drive assembly. This is ideal for moving an object between the test position and the holding position along an almost constant floor surface area with an inexpensive device. Moreover, the connecting means is also simple.

Furthermore, although a different embodiment, it is possible to use a structure wherein the drive assembly has a perpendicular axis of rotation anchored to this first movable carriage and perpendicular to the above-mentioned anchoring surface which is used for turning and moving said first movable carriage along the above-mentioned anchoring surface, and a motor for rotating this perpendicular axis of rotation. This is ideal for moving an object to the left and right between the test position and the holding position using an ordinary inexpensive device.

In addition, it is also possible to use a drive assembly that moves said first movable carriage along the direction perpendicular to the above-mentioned anchoring surface. In this case, the structure is ideal wherein the drive assembly is a rotary actuator with a cam and the above-mentioned first movable carriage has a linear slider with a cam follower that engages with said cam.

The method for holding an object at a predetermined position on an anchoring surface at a predetermined height from this anchoring surface, which is the second subject of the present invention, comprises the step whereby a first movable carriage with a means for suctioning onto the above-mentioned anchoring surface is made ready, the step whereby the above-mentioned object is loaded onto said first movable carriage, the step whereby a second movable carriage with a drive assembly and which can be freely connected with the first movable carriage is made ready, the step whereby the above-mentioned connecting means for said first and second movable carriages is made ready, the step whereby said first and second movable carriages are connected by the above-mentioned drive assembly and said first movable carriage is conveyed to a predetermined position on the above-mentioned anchoring surface, and the step whereby said first movable carriage is suctioned and anchored onto the above-mentioned anchoring surface at the above-mentioned predetermined position by a means that breaks the connection between said first and second movable carriages and performs the above-mentioned suctioning.

Moreover, it is preferred that said suctioning be started before the connection between said first and second movable carriages is broken in the above-mentioned suctioning and anchoring step because positioning can be accomplished with greater accuracy. It is clear that the same results as with the first subject are obtained with this second subject of the invention of the present invention.

The following explanation of the designations is provided for a better understanding of the Figures:

| | |
|---|---|
| 10, 20, 30, 40, 70, 80, 90 | Positioning devices |
| 44, 744, 844, 944 | First movable carriages |
| 45, 745, 845, 945 | Second movable carriages |
| 46, 746, 846, 946 | Heads |

DETAILED DESCRIPTION OF THE INVENTION

Figure 4:
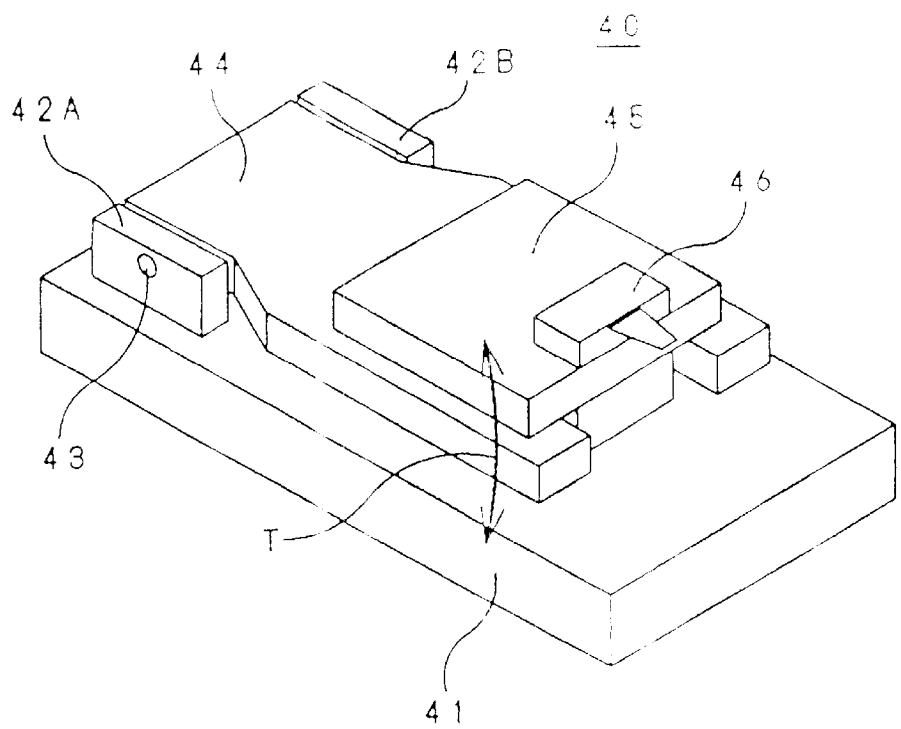
FIG. 4 is an oblique view of the positioning device of the first example of the present invention.
Figure 5:
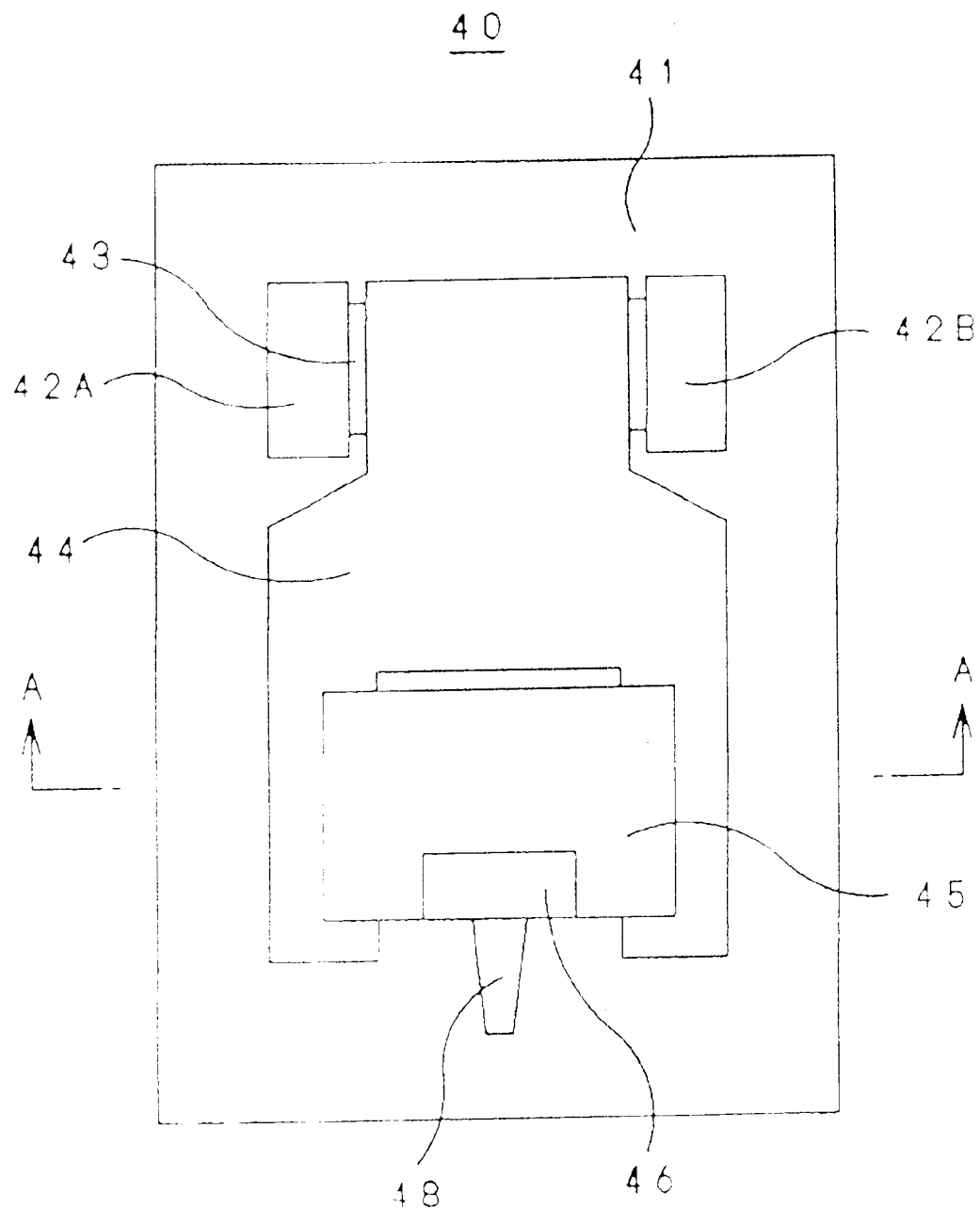
FIG. 5 is a plane view of the positioning device of the first example of the present invention.
Figure 6:
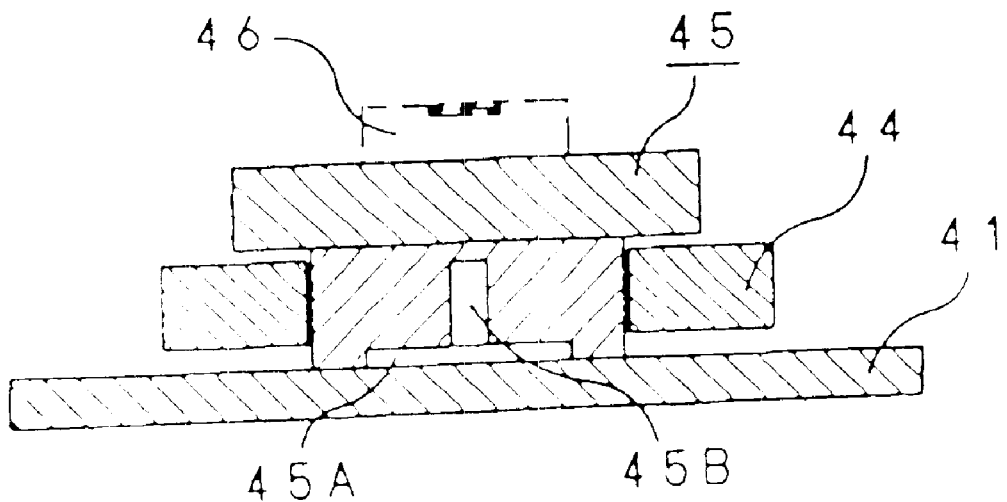
FIG. 6 is an A—A cross section of FIG. 5 of the positioning device of the first example of the present invention.
Figure 6:
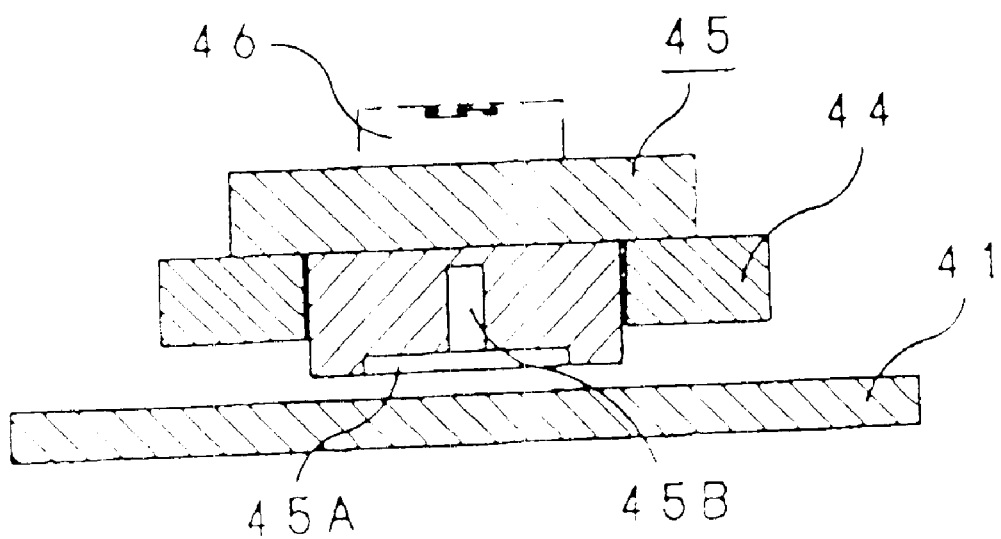

The rest of the structure and other results of the present invention will likely be made evident from the following:

An oblique view of positioning device 40, which is the first example for explaining the present invention, is shown in FIG. 4, and the plane view is shown in FIG. 5 and the A—A cross section of FIG. 5 is shown in FIG. 6. Positioning device 40 is incorporated in a testing device for testing magnetic heads that write on hard disks and is ideal as a load-unload mechanism of head 46. First, movable carriage 45 changes the angle of inclination of tilt base 44, which is the second movable carriage, and moves head 46 to above the recording medium, which is not illustrated, during loading and unloading of head 46. The top of stationary plate 41 is an end face that is a horizontal surface and therefore, part of this end face functions as a horizontal anchoring surface. When the connection between the first and second movable carriages is broken, both carriages are moved facing the same way in one direction with gravity. Thus, positioning accuracy can be easily improved, and the detrimental effects of gravity on positioning stability can be avoided, by using gravity efficiently. It is also possible for the position of the anchoring surface to be the same as the direction of gravity (down), or to be perpendicular to or inclined toward the direction of gravity as needed.

Figure 1:
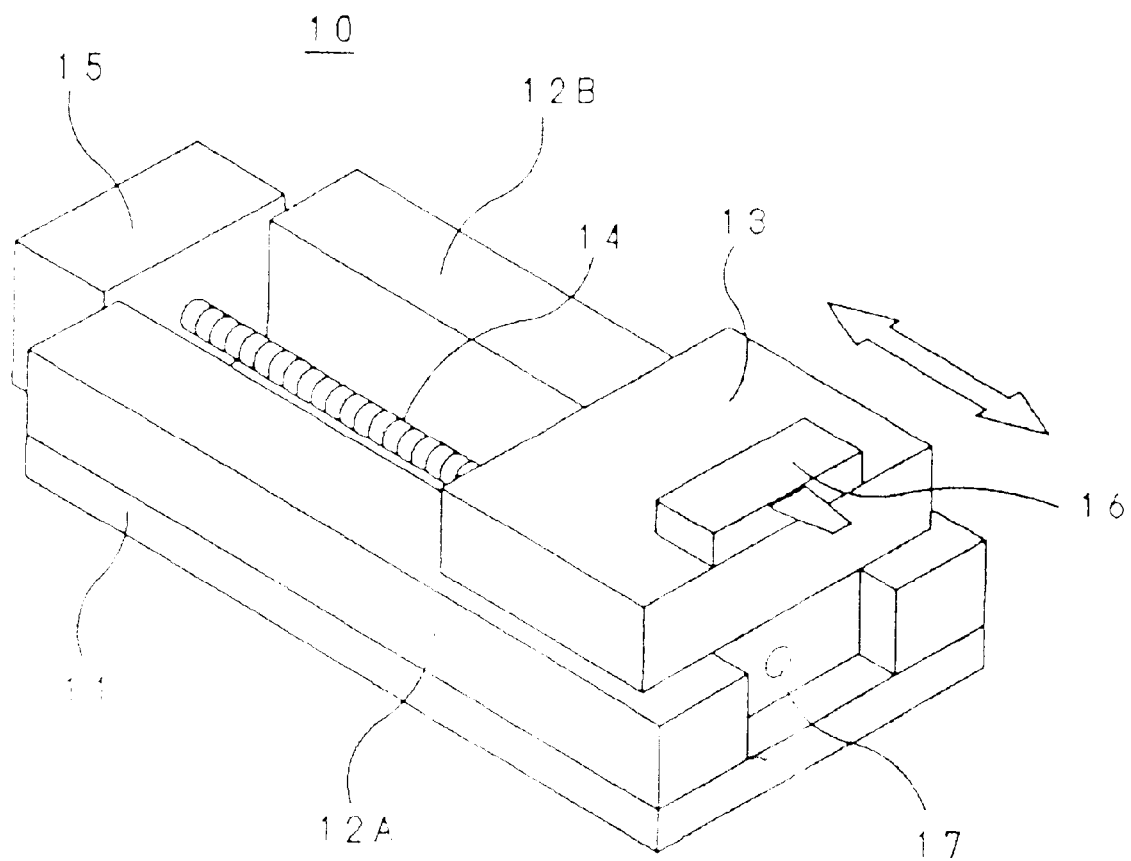
FIG. 1 is an oblique view of the positioning device of the first design of the prior art.
Figure 2:
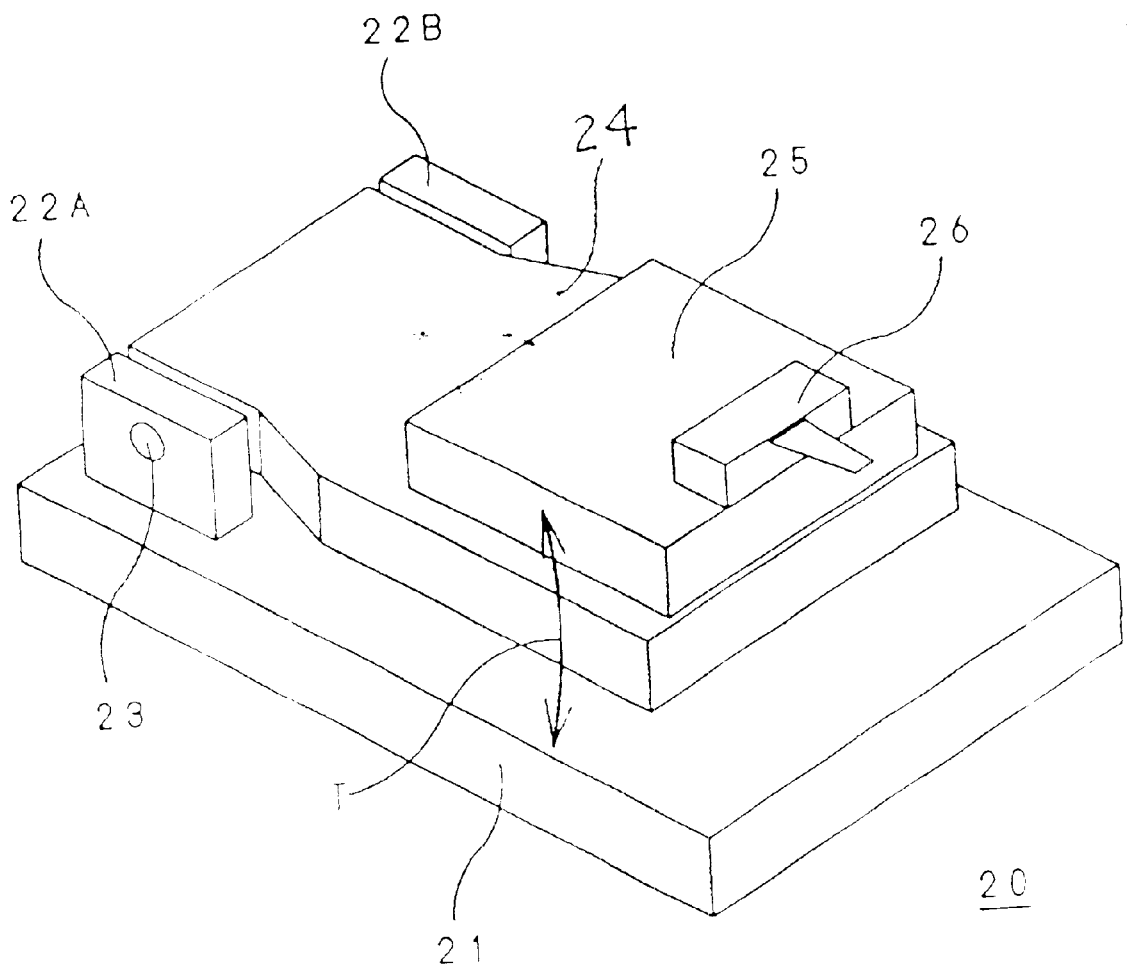
FIG. 2 is an oblique view of the positioning device of the second design of the prior art.
Figure 3:
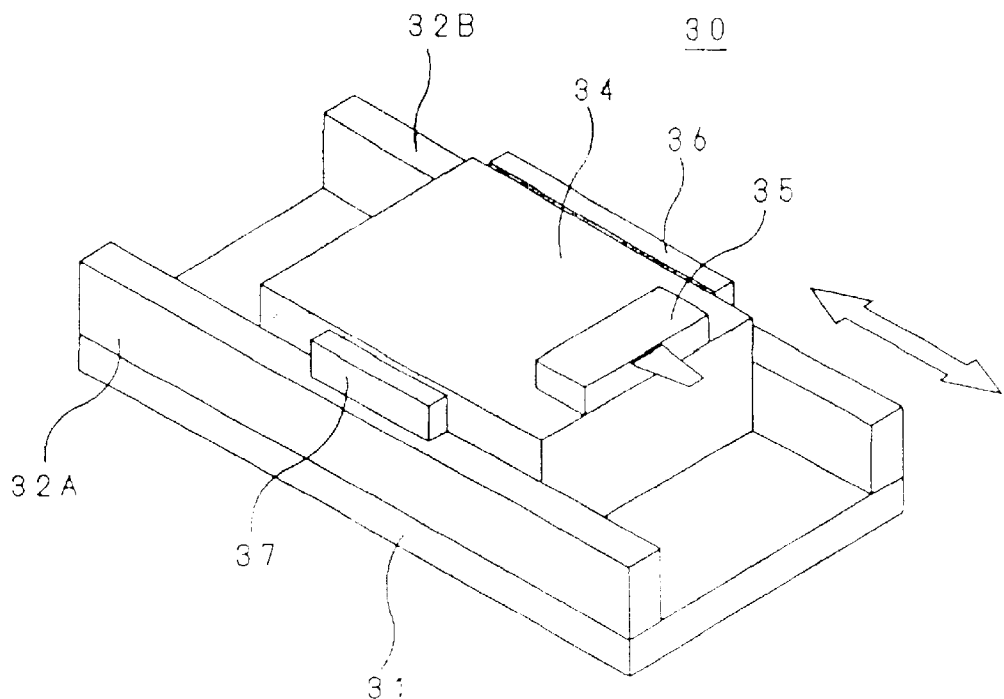
FIG. 3 is an oblique view of the positioning device of the third design of the prior art.
Figure 7:
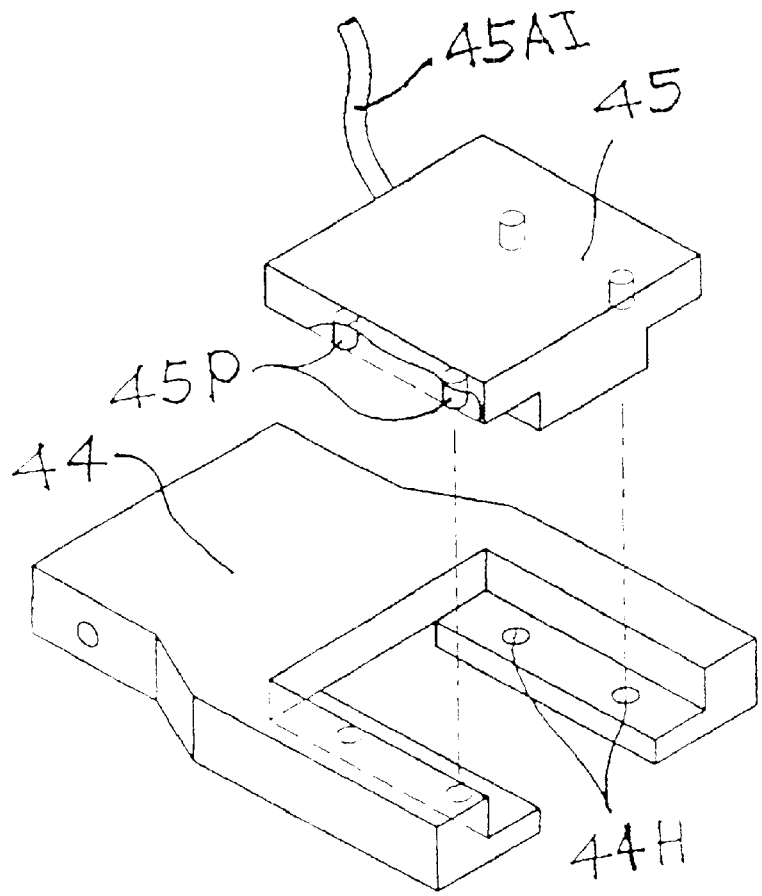
FIG. 7 is a diagram describing the state of connection of tilt base 44 and pedestal 45 of the positioning device of the first example of the present invention.

The operation of positioning device 40 with tilt base 44 is the same as in the case of positioning device 20 of the second design of the prior art that was described in connection with FIG. 2 and therefore, its description is eliminated. By means of positioning device 40, tilt base 44 (made of aluminum in the present example), is attached so that it can turn as needed to tilt axis of rotation 43 anchored by the pair of bearings 42A and B that have been anchored onto stationary plate 41 made of granite. Pedestal 45, on which head 46 is anchored and riding at the end of the side opposite tilt axis of rotation 43, is loaded onto tilt base 44. Pedestal 45 preferably has multiple positioning posts 45P, as shown in FIG. 7. These posts 45P engage so that they can be inserted or removed as needed into the corresponding positioning holes 44H of tilt base 44. Once positioned and in a resting position, pedestal 45 is moved away from tilt base 44. Moreover, it is also possible to stably anchor pedestal 45 to stationary plate 42 using screws 45S.

Figure 8:
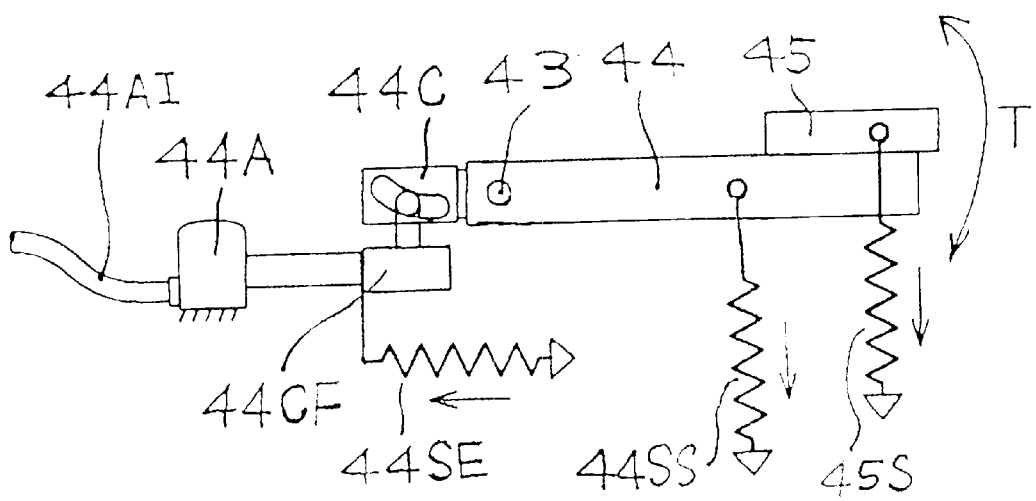
FIG. 8 is a diagram describing the operation of tilt base 44 of the positioning device of the first example of the present invention.

The drive of tilt table 44 will be described with reference to FIG. 8. The drive assembly and related parts of tilt base 44 that were omitted from FIGS. 4 and 5 are shown in FIG. 8. Tilt base 44 is pulled perpendicular to the side of stationary plate 41 side by perpendicular extension springs 44SS engaged with this tilt base 44 and stationary plate 41. In accordance with this, rear cam 44C turns up when axis 43 is rotated. On the other hand, push spring 44SE, which is engaged in cam follower 44CF and stationary plate 41, makes cam follower 44CF, which engages with cam 44C, spring back to the left in the figure. The tilt operation of tilt base 44 is performed in the direction of arrow T in the figure using an actuator, such as air cylinder 44A, etc., anchored to stationary plate 41 and head 46 that has been loaded is positioned. When cam follower 44CF moves to the right in accordance with the compressed air that has been fed to air cylinder 44A, cam 44C is lowered to the side of stationary plate 41. As a result, the angle of inclination of tilt table 44 is increased so that pedestal 45 is raised away from stationary plate 41. When the introduction of compressed air is stopped, cam follower 44 is pushed back to the left by push springs 44SE and cam 44C is raised away from stationary plate 41. As a result, tilt base 44 is lowered and inclined so that pedestal 45 comes closer to stationary plate 41. Once pedestal 45 reaches the anchoring surface, tilt base 44 turns further and the connection with pedestal 45 is completely broken. Air cylinder 44A is operated by the compressed air from tube 44AI, which feeds and evacuates compressed gas.

When the angle of inclination of tilt base 44 to the top surface of stationary plate 41 is increased by the actuator, head 46 is positioned away from stationary plate 41 and head 46 is replaced, adjusted, etc. Tilt base 44 is connected to pedestal 45 and pedestal 45 is raised up away from stationary plate 41 in this state, as shown in FIG. 6(B). Next, cam follower 44CF is moved to the left by the effect of push spring 44SS in accordance with the introduction of compressed air to air cylinder 44A being stopped so that the angle of inclination of tilt base 44 is reduced and pedestal 45 contacts the top surface of stationary plate 41. Once the outer periphery wall of pedestal 45 has contacted the top surface of stationary plate 41, tilt base 44 is turned further and the connection with pedestal 45 is completely broken so that there is no contact whatsoever between the two (FIG. 6(A)).

The surface of pedestal 45 facing stationary plate 41 has a relatively wide opening 45A through which gas, ideally air, is suctioned and emitted via flexible feed and evacuation tubing 45A. When air is suctioned to inside pedestal 45 via this wide opening 45A, the connected outer periphery walls of opening 45A fit closely to the top surface of stationary plate 41 and eventually reach a state of vacuum suction. Pedestal 45 is stably positioned on stationary plate 41 in this state. It is preferred that the primary characteristic frequency of pedestal 45 be set at 1 kHz or higher in order to guarantee the accuracy of precision positioning of head 46.

The narrow tubing 45B that extends from wide opening 45A is connected to an outside air feed and evacuation device via flexible feed and evacuation tubing 45AI shown in FIG. 7. Feed and evacuation tubing 45AI is preferably fairly flexible and will essentially not inhibit the movement of tilt base 44 or pedestal 45. The same relationship is established in the examples that follow between identical parts pertaining to the introduction and evacuation of gases.

When air is introduced to wide opening 45A from the outside air feed and evacuation device via feed and evacuation tubing in order to remove the state of vacuum suction, pedestal 45 is no longer suctioned to stationary plate 41. Tilt base 44 re-connects with pedestal 45 when the angle of inclination of tilt base 44 is increased upward. Then head 46 moves away from stationary plate 41. The air that passes through the feed and evacuation tubing can be stopped if suctioning is not being performed, but it is preferred that it be introduced through the tubing to such an extent that a small amount is continually being blown out.

It is preferred that the timing of breaking the connection and vacuum suctioning be adjusted so that vacuum suctioning is initiated when head 46 has reached a horizontal position, that is, the position where it is parallel to the stationary plate, and the connection between tilt base 44 and pedestal 45 is then broken in order to improve the accuracy of the suctioning position and position stability.

Furthermore, refer to the explanation of the above-mentioned vacuum suctioning technology as disclosed in International patent application WO99/66498, the Specification of above-mentioned U.S. Pat. No. 4,778,143, and Japanese Kokai Patent No. Sho 61(1986)-4638.

Anchoring methods other than vacuum suctioning: Magnetic attraction with a magnet (discussed below with FIGS. 14 and 15) and a mechanical system (something like an air clamp) are also possible. A mechanical system always requires that there is contact between the means that is applying force and the object that is to be anchored. It might be difficult to use a mechanical system when the carriage is moved a great distance, as in the case of a first movable carriage on top, which is anchored at any position.

Figure 9:
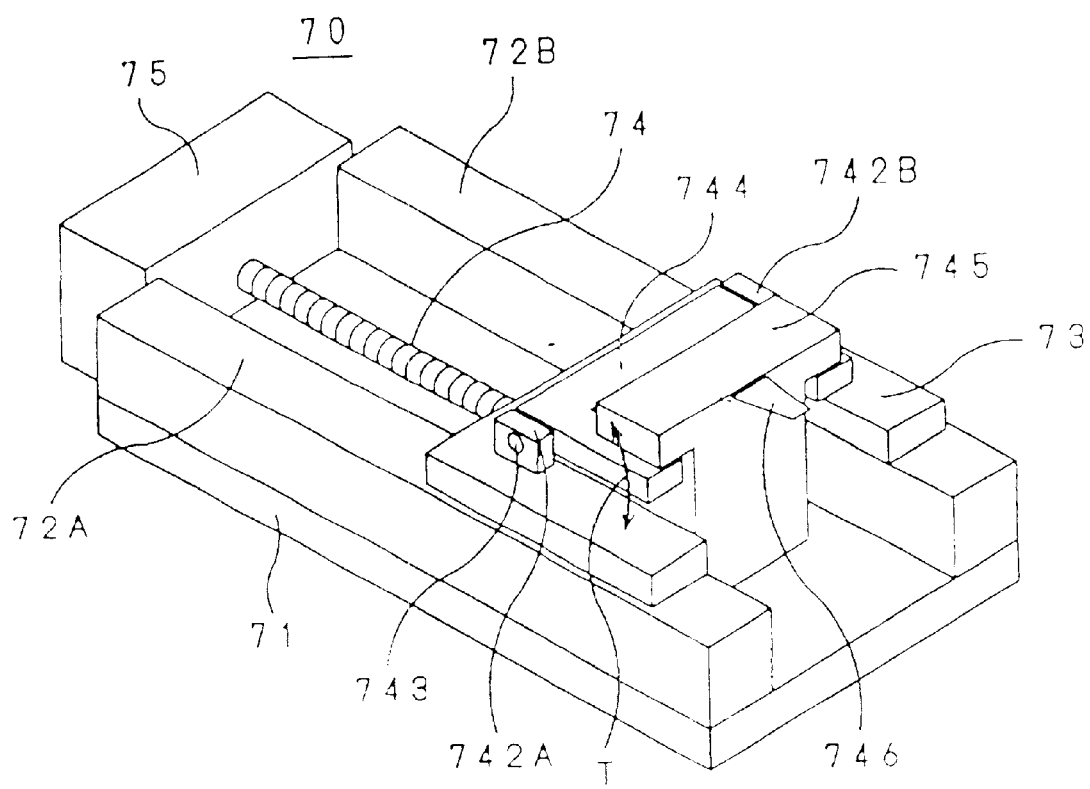
FIG. 9 is an oblique view of the positioning device of the second example of the present invention.

By means of positioning device 70, which is a second example of the present invention shown in FIG. 9, a structure is used whereby a connecting means that performs the inclination operation is loaded on positioning device 10 from the above-mentioned first design of the prior art.

By means of positioning device 70, a pair of linear guides 72A and B, which are set up parallel to one another on stationary plate 71, guide movable carriage 73, which rides on top of these guides by conventional methods along these linear guides 72A and B. The operation of movable carriage 73 is the same as the operation in positioning device 10. Servo motor 75 is anchored to one end of linear guides 71A and B. Nut 17 attached to movable carriage 72 via ball screw 74 is engaged and driven by the axis of this servo motor 75 to drive movable carriage 73.

Aluminum tilt base 744 is attached so that it can turn as needed relative to tilt axis of rotation 743, which is anchored to the pair of bearings 742A and B anchored to movable carriage 73, at this movable carriage 73. Pedestal 745 on which head 746 rides anchored is loaded at the end of the side opposite tilt axis of rotation 743 on tilt base 744, and this base performs the same tilting operation as tilt base 44 of above-mentioned positioning device 10. The end face of pedestal 745 on the side of stationary plate 71 is a structure whereby vacuum suctioning to the top surface of stationary plate 71 is accomplished by means of through-holes made in movable carriage 73. Tilt base 744 performs the tilting operation in the direction of arrow T in the figure using an actuator, such as an air cylinder, etc., anchored to this movable carriage 73, which is not illustrated, in order to position head 746. This movable carriage 73 and the structure where it is loaded on the top of this base is essentially equivalent to stationary plate 41 of the first example and the structure where the movable carriage is loaded on top. However, the height of pedestal 745 is higher.

Tilt base 744 moves away from movable carriage 73 and head 746, which is loaded on pedestal 745 connected to tilt base 744, is positioned away from stationary plate 71 when the angle of inclination of tilt base 744 to the top surface of movable carriage 73 is increased by the actuator. In this state, tilt base 744 is connected with pedestal 745 and pedestal 745 is raised so that tilt base 744 is moved away from stationary plate 71. Next, as in the first example, tilt base 744 is once again turned down by the actuator so that pedestal 745 is brought into contact and anchored to the top surface of stationary plate 71 while being vacuum suctioned. Once the outer periphery walls of pedestal 745 have made contact with the top surface of stationary plate 71, the connection between tilt base 744 and pedestal 745 is completely broken and there is no contact whatsoever between the two.

The method by which pedestal 745 is anchored to stationary plate 71 is not limited to vacuum suctioning with this structure. An application of force whereby pedestal 745 rests on the top surface (anchoring surface) of stationary plate 71 should be required.

Moreover, the mechanism by which the connection between pedestal 745 and stationary plate 71 is broken is not limited to the above-mentioned tilting mechanism.

Figure 10:
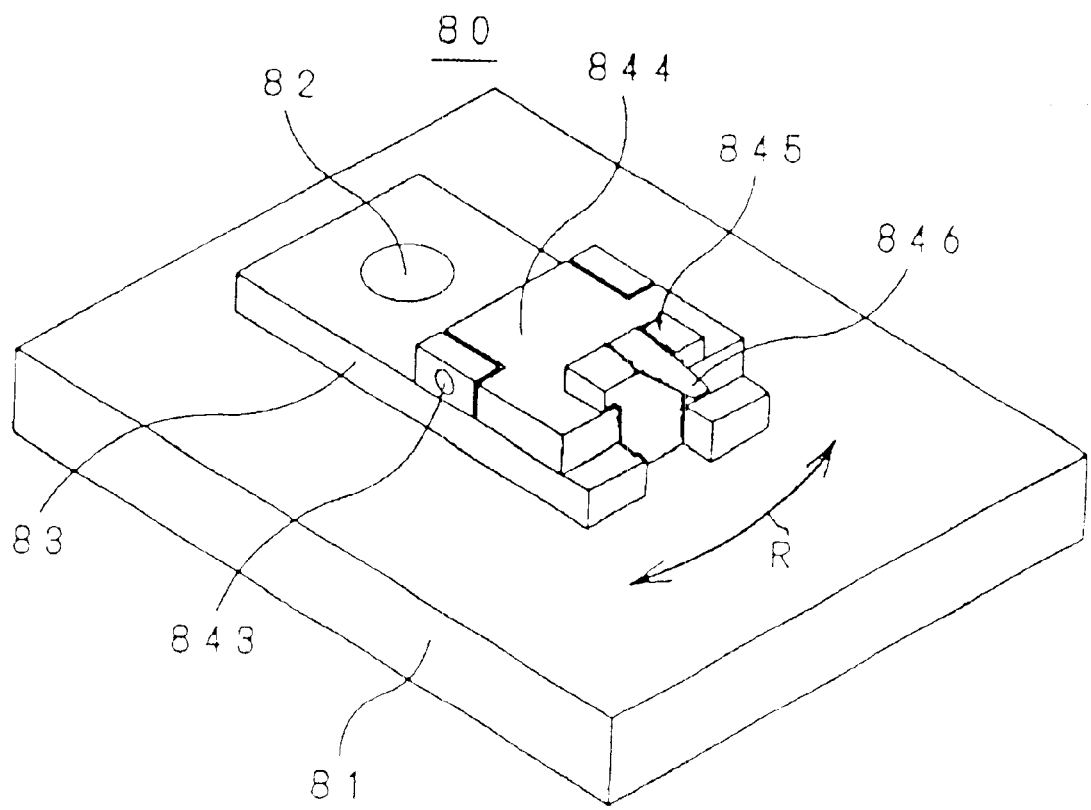
FIG. 10 is an oblique view of the positioning device of the third example of the present invention.

FIG. 10 is an oblique view of positioning device 80, which is a third example of the present invention. Although movable carriage 73 ran linearly in the above-mentioned second example, this third example is different in that it has a structure wherein the corresponding movable carriage 83 runs by being turned in the direction of arrow R around turning bearing 82 set up on stationary plate 81. However, the operation of tilt base 844 and pedestal 845 with respect to stationary plate 81 and movable carriage 83 is the same as the operation of tilt base 744 and pedestal 745 with respect to stationary plate 71 and movable carriage 73.

Positioning device 90, which is a fourth example of the present invention, will be described while referring to FIGS. 11 through 13.

Positioning device 90 of the present invention comprises the anchoring surface of stationary plate 91, first movable carriage 945 on which object 946 to be positioned is loaded and which has a means for suctioning to the above-mentioned anchoring surface, second movable carriage 944 which has drive assemblies 950, 922C and can be connected as needed with the first movable carriage, and a connecting means for controlling the connection of the above-mentioned first and second movable carriages.

Said first and second movable carriages are connected by the above-mentioned drive assemblies. The above-mentioned first movable carriage is conveyed up and down to a predetermined position on the above-mentioned anchoring surface and said first movable carriage is suctioned and anchored to the above-mentioned anchoring surface by a means that breaks the connection between said first and second movable carriages at this predetermined position and performs the above-mentioned suctioning in order to position the above-mentioned object.

Figure 11:
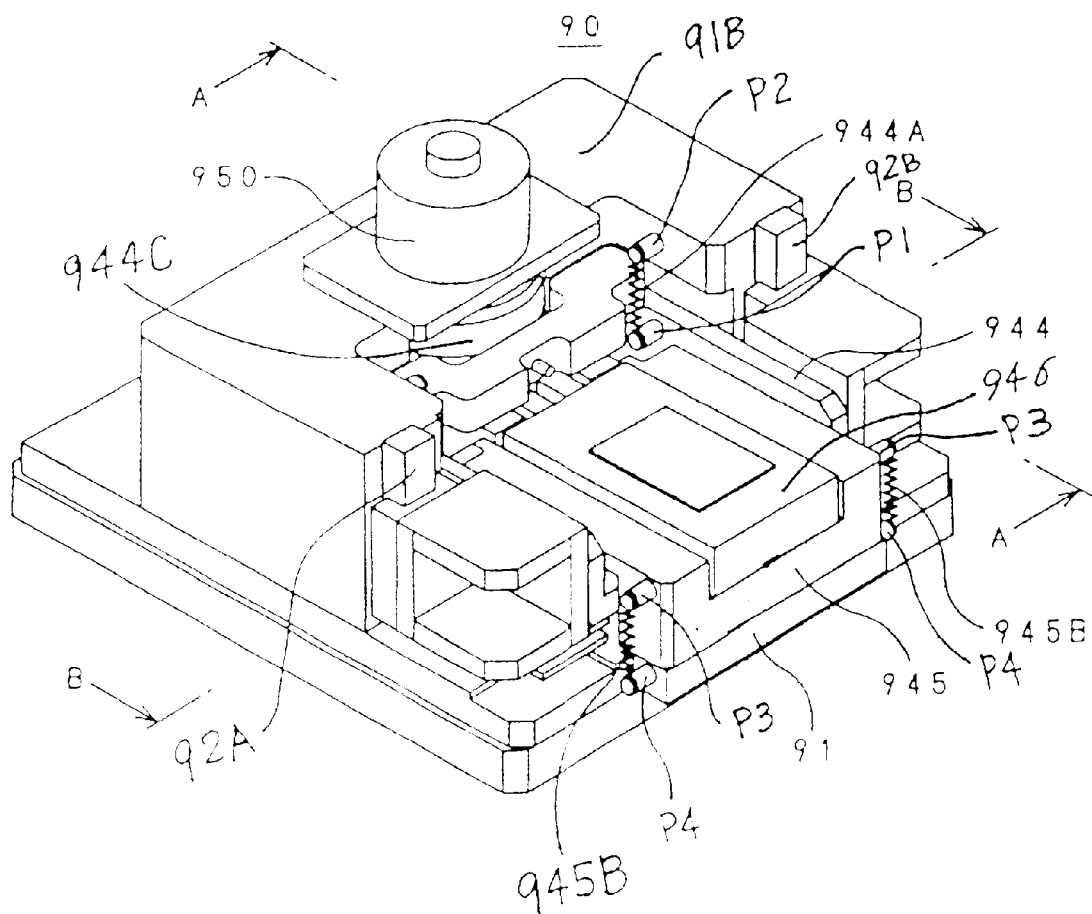
FIG. 11 is an oblique view of the positioning device of the fourth example of the present invention.
Figure 12:
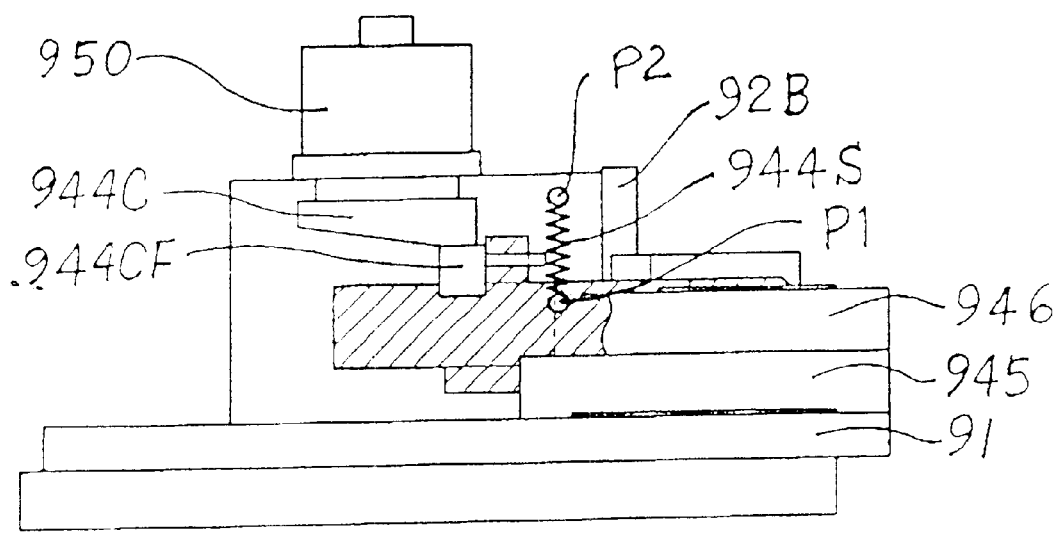
FIG. 12 is the partial A—A cross section of the positioning device in FIG. 11.

FIG. 11 is an oblique view of positioning device 90. FIG. 12 is the partial A—A cross section of positioning device 90 in FIG. 11 and FIG. 13 is the B—B cross section of the positioning device in FIG. 11. Positioning device 90 is ideal as a load-unload mechanism for head 946 incorporated in a test device for testing magnetic heads that read-write on hard disks. Furthermore, head 946 in the figure is part of the base (actually, the PIEZO stage) to which the magnetic head is attached, and movable carriage 945 moves as one unit with head 946. The perpendicular position of elevator 944, which is the second movable carriage, changes and as a result, first movable carriage 945 moves the magnetic head (not illustrated) comprising head 946 above the recording medium, which is not illustrated, during loading and unloading of head 946, which is connected and loaded on first movable carriage 945. The top of stationary plate 91 is an end face that forms a horizontal surface and therefore, gravity is efficiently used when the first and second movable carriages are connected and disconnected, making it possible to easily improve the positioning accuracy and avoid the detrimental effects of gravity on the positioning stability.

The operation of positioning device 90 involves connecting elevator 944 beneath first movable carriage 945 and raising and lower this end as it is controlled and guided by linear guides 92A and B laid in frame 91 B anchored to stationary plate 91. Moreover, multiple pins P1 and P2 are embedded in elevator 944 and frame 91B, respectively. Spring 944S is attached between the corresponding pins P1 and P2 of elevator 944 and frame 91B and elevator 944 is raised up (refer to FIG. 12 as well).

On the other hand, cam follower 944CF is anchored to elevator 944 and engages with cam 944C, which is driven by rotary actuator 950 loaded on frame 91B. Rotary actuator 950 turns cam 944C and drives cam follower 944CF down. Cam follower 944CF is raised and lowered in accordance with a height that is changed by rotation of cam 944C by the lifting force from spring 944S.

Figure 13:
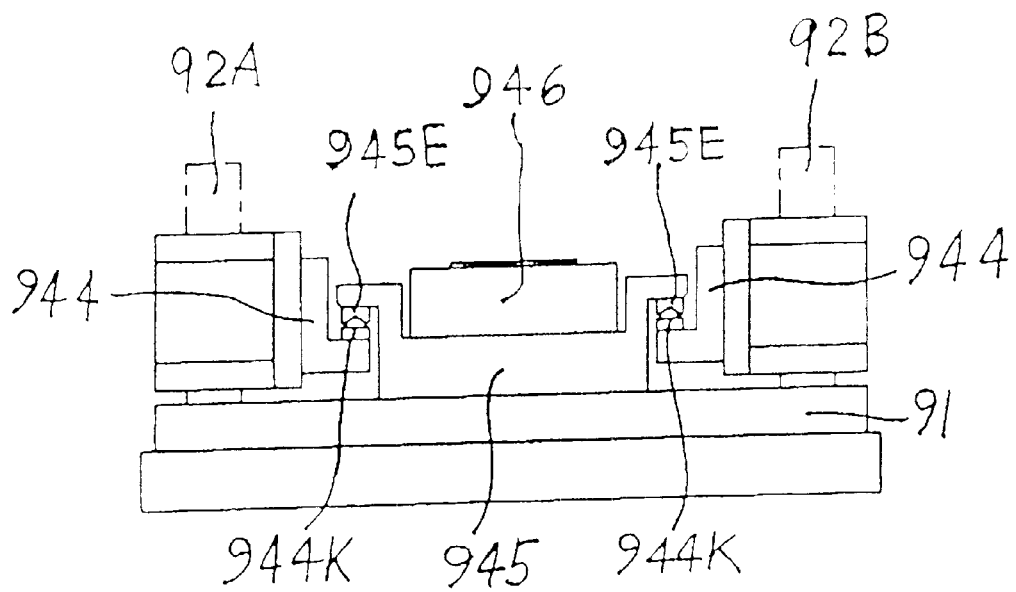
FIG. 13 is the B—B cross section of the positioning device in FIG. 11.

Referring to FIGS. 11 and 13, multiple pins P3 and P4 are embedded in both movable carriage 945 and stationary plate 91. Spring 945B is attached as illustrated between the corresponding pins P3 and P4 and movable carriage 945 is pulled to the side of stationary plate 91.

The positioning of elevator 944 and first movable carriage 945 is different from that in FIG. 7 in that spherical surface 944K, which is anchored to elevator 944, engages with conical surface 945E anchored to first movable carriage 945. For instance, 3 pairs of spherical surfaces 944K and conical surfaces 945E are set up to establish one plane and guarantee stable connection.

First movable carriage 945 has a gas feed and evacuation function for anchoring to the anchoring surface of stationary plate 91 by vacuum suctioning, and this mechanism and operation are the same as the mechanism and function pertaining to pedestal 45 and stationary plate 41 described in the first example. First movable carriage 945 has a feed and evacuation tubing corresponding to flexible feed and evacuation tubing 45AI and is suctioned to the anchoring surface of stationary plate 91 corresponding to stationary plate 41. The air in the feed and evacuation tubing is stopped while elevator 944 and first movable carriage 945 are connected and moved, or is allowed to flow so that some blows out from the first movable carriage, breaking the connection and initiating vacuum suctioning, preferably shortly before this connection is broken. It is possible to use various relationships between the direction of the anchoring surface of stationary plate 91 and the direction of gravity, but the above-mentioned advantages can be produced when the anchoring surface is a horizontal surface in the present example.

Figure 14:
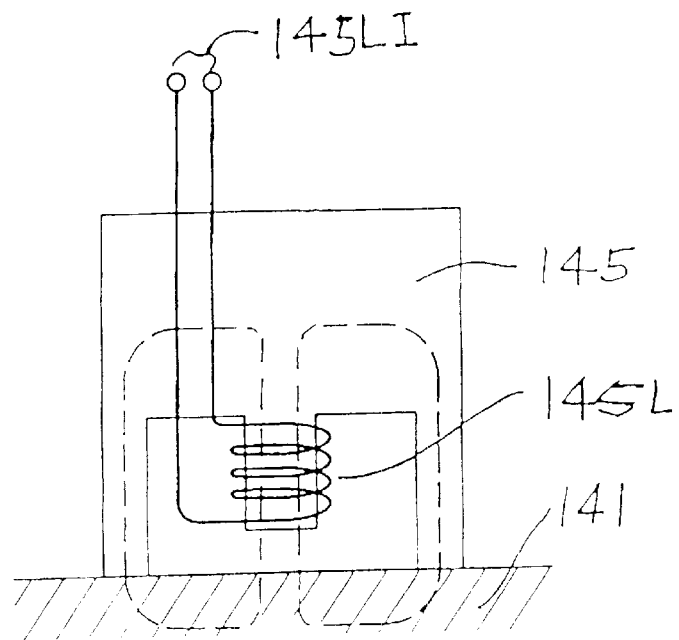
FIG. 14 is a diagram explaining magnetic attraction.
Figure 15:
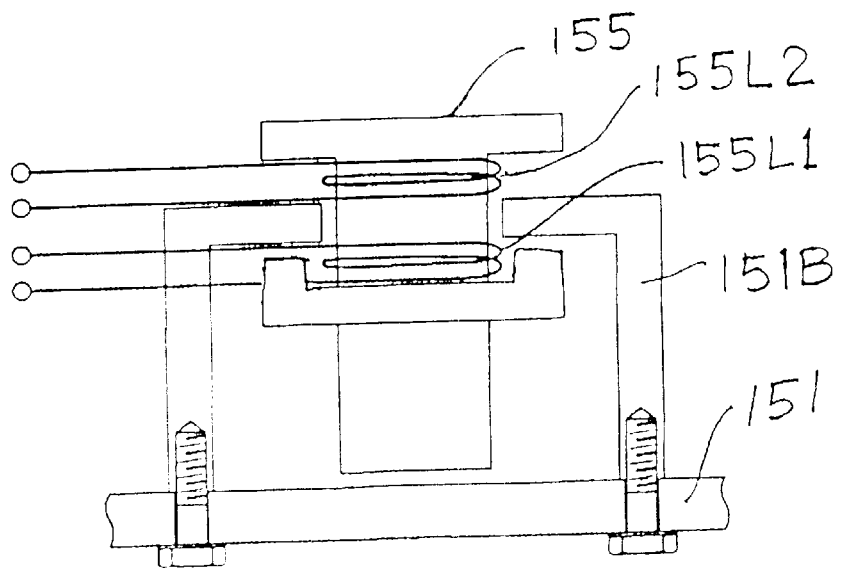
FIG. 15 is a diagram explaining magnetic attraction.

Although the present invention has been described with examples, various changes are possible within the scope of the present invention. For instance, magnetic attraction or repulsion can be used in place of vacuum suctioning, as previously mentioned. An example of this is shown in FIGS. 14 and 15. First movable carriage 145 is positioned and anchored on stationary plate 141 made from steel or soft iron with a high magnetic permeability, or coated with a non-magnetic material, such as aluminum, etc. By means of the present example, the first movable carriage has a cavity on the side of stationary plate 141 and the column placed in the middle of this cavity is extended close to the anchoring surface of stationary plate 141. The column is wrapped with an insulated cable to form a coil that comprises magnet 145L. End 145LI of this cable is pulled to outside first movable carriage 145 and this end 145LI is connected to a power source (not illustrated). It is possible to control the pulling force between stationary plate 141 and first movable carriage 145 by controlling the current that flows from the power source to the cable.

In FIG. 15, first movable carriage 155, which contains a magnetic substance, is positioned and anchored on stationary plate 151, which contains a magnetic substance. By means of this example, first movable carriage 155 is anchored to stationary plate 151 and extends through the hole in frame 151B of a magnetic substance. First movable carriage 155 has a flange at the top and bottom of this hole and a coil between these flanges and the frame. These coils respectively form electromagnets 155L1 and 155L2.

When electromagnet 155L2 is excited, the top flange and frame 151B are pulled together, while when magnet 155L1 is excited, the bottom flange and frame 151B are pulled together.

The stationary plate is made of granite in many of the above-mentioned examples. Steel, which is inexpensive and easy to handle can also be used. Moreover, aluminum is ideal for the first and second movable carriages because it is lightweight, but it is obvious that a different material that is appropriate for parts that require dimensional accuracy and stability should be used.

Several results obtained by executing the present invention have already been noted. However, by means of the positioning device of the present invention, in particular, the drive assembly and the second movable carriage are connected and disconnected from the first movable carriage using a simple connecting means. Consequently, the effects of the mechanical noise and vibrations from the drive assembly and second movable carriage after positioning can be eliminated. Therefore, positioning stability can be kept high while making it possible to use an inexpensive drive assembly and inexpensive second movable carriage. Thus, the cost of the positioning device is reduced.

I claim:

1. A positioning device for determining the position of an object, comprising:

an anchoring surface, a first movable carriage on which said object is loaded and which has a means for suctioning onto said anchoring surface, a second movable carriage which has a drive assembly, and a connecting means which controls said connection of said first and second movable carriages, wherein said first and second carriages are connected and disconnected as needed and wherein said first and second movable carriages are connected by said drive assembly and said first movable carriage is conveyed to a predetermined position on said anchoring surface and said first movable carriage is suctioned and anchored on said anchoring surface at this predetermined position by a means for breaking the connection between said first and second movable carriages and performing said suctioning so that said object is positioned.

2. A positioning device according to claim 1, wherein said connecting means is anchored to said first movable carriage.

3. A positioning device according to claim 1, wherein said connecting means is anchored to said second movable carriage.

4. A positioning device according to claim 1, wherein the means for accomplishing said suctioning is a vacuum suction plate having a gas feed and an evacuation inlet that communicates with a gas feed and evacuation device.

5. A positioning device according to claim 1, wherein said drive assembly has a ball screw which engages with said first movable carriage and which is used for running said first movable carriage forward, and a motor which is used for turning this ball screw.

6. A positioning device according to claim 1, wherein said drive assembly has an axis of rotation which keeps said first movable carriage inclined as needed with respect to said anchoring surface and which is used for inclining said first movable carriage with respect to said anchoring surface, and an actuator which controls the inclination of the first movable carriage by rotating this axis of rotation.

7. A positioning device according to claim 1, wherein said drive assembly has a perpendicular axis of rotation anchored to this first movable carriage and perpendicular to said anchoring surface, which is used for turning and moving said first movable carriage along said anchoring surface, and a motor which is used for rotating this perpendicular axis of rotation.

8. A positioning device according to claim 1, wherein said drive assembly moves said first movable carriage along the direction perpendicular to said anchoring surface.

9. A positioning device according to claim 8, wherein said drive assembly is a rotary actuator with a cam and said first movable carriage has a linear slider with a cam follower that engages with said cam.

10. A positioning device according to claim 1, wherein said anchoring surface is a horizontal surface.

11. A positioning device according to claim 1, wherein said anchoring surface is a granite end face, and said vacuum suction plate is aluminum.

12. A positioning device according to claim 1, wherein said object comprises a magnetic head and a precision positioning device for the magnetic head.

13. A method for positioning and holding an object at a predetermined position on an anchoring surface at a predetermined height from the anchoring surface, the method comprising:

making ready a first movable carriage with a means for suctioning onto said anchoring surface, loading the object onto said first movable carriage, making ready a second movable carriage with a drive assembly and which can be freely connected with the first movable carriage, making ready the connecting means for said first and second movable carriages, connecting the first and second movable carriages by said drive assembly, conveying said first movable carriage to a predetermined position on said anchoring surface, and suctioning and anchoring said first movable carriage onto said anchoring surface at said predetermined position by a means that breaks the connection between said first and second movable carriages and performs said suctioning.

14. The method according to claim 13, wherein said connecting means is anchored to said first movable carriage.

15. The method according to claim 13, wherein said connecting means is anchored to said second movable carriage.

16. The method according to claim 13, wherein the means for performing said suctioning is a vacuum suction plate having a gas feed and an evacuation inlet continuous with said gas feed and an evacuation device.

17. The method according to claim 13, wherein said suctioning is initiated before the connection between said first and second movable carriages is broken during said suctioning and anchoring step.

* * * * *